US008069450B2

(12) United States Patent
Beresnevichiene et al.

(10) Patent No.: US 8,069,450 B2
(45) Date of Patent: Nov. 29, 2011

(54) COMPUTER OPERATING SYSTEM DATA MANAGEMENT

(75) Inventors: Yolanta Beresnevichiene, Bristol (GB);
David Plaquin, Bristol (GB);
Christopher I. Dalton, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2058 days.

(21) Appl. No.: 10/765,827

(22) Filed: Jan. 26, 2004

(65) Prior Publication Data
US 2004/0194104 A1    Sep. 30, 2004

(30) Foreign Application Priority Data

Jan. 27, 2003    (GB) .................................. 0301777.9

(51) Int. Cl.
G06F 3/00 (2006.01)
G06F 9/44 (2006.01)
G06F 9/46 (2006.01)
G06F 13/00 (2006.01)

(52) U.S. Cl. ........................... 719/313; 707/705; 726/17
(58) Field of Classification Search .................... 726/27; 713/200; 719/313; 707/9
See application file for complete search history.

(56) References Cited

U.S. PATENT DOCUMENTS

| 5,414,852 | A | | 5/1995 | Kramer et al. ................. 395/700 |
| 5,765,153 | A | * | 6/1998 | Benantar et al. .................... 707/9 |
| 5,922,073 | A | | 7/1999 | Shimada ......................... 713/200 |
| 5,960,198 | A | | 9/1999 | Roediger et al. |
| 6,088,801 | A | * | 7/2000 | Grecsek ............................ 726/1 |
| 6,412,070 | B1 | * | 6/2002 | Van Dyke et al. .............. 726/17 |
| 6,725,451 | B1 | | 4/2004 | Schuetz et al. |
| 6,944,777 | B1 | * | 9/2005 | Belani et al. .................. 713/150 |
| 7,266,538 | B1 | * | 9/2007 | Shatil ................................ 707/1 |
| 2002/0095432 | A1 | | 7/2002 | Shimomura et al. .......... 707/200 |
| 2007/0006178 | A1 | | 1/2007 | Tan |
| 2007/0234307 | A1 | | 10/2007 | Luk et al. |

FOREIGN PATENT DOCUMENTS

| EP | 0 849 658 A2 | 6/1998 |
| GB | 2 301 912 A | 12/1996 |
| JP | 11-272616 | 10/1999 |

OTHER PUBLICATIONS

Besson et al, "Model checking security properties of control flow graphs", Journal of Computer Security, Jan. 2001, pp. 1-33.*
Larus et al, EEL: Machine-Independent Executable Editing, ACM, 1995, pp. 291-300.*
PASTE 2005: Program Analysis for Software Tools and Engineering, 6th ACM SIGPLAN-SIGSOFT Workshop on Program Analysis for Software Tools and Engineering, Sep. 5-6, 2005, Lisbon, Portugal, retrieved from http://groups.csail.mit.edu/pag/paste2005/ on Mar. 8, 2010, 6 pages.

(Continued)

Primary Examiner — Diem Cao

(57) ABSTRACT

A method of computer operating system data management comprising the steps of: (a) associating data management information with data input to a process (300); and (b) regulating operating system operations involving the data according to the data management information is provided (310). A computing platform (1) for operating system data management is also provided. Furthermore, a computer program including instructions configured to enable operating system data management, an operating system, and an operating system data management method and apparatus arranged to identify data having data management information associated therewith when that data is read into a memory space are provided.

56 Claims, 9 Drawing Sheets

OTHER PUBLICATIONS

Kumar, N., Childers, B. and Soffa, M.L., Low Overhead Program Monitoring and Profiling, Proceedings of the 6th ACM SIGPLAN-SIGSOFT Workshop on Program Analysis for Software Tools and Engineering, 2005, pp. 28-34.

Scott, K., et at., Overhead Reduction Techniques for Software Dynamic Translation, Proceedings of 18th International Parallel abd Distributed Processing Symposium [online], Apr. 2004 [retrieved Nov. 2, 2009]. Retrieved from Internet: <URL:http://cs.pitt.edu/~naveen/papers/nsf2004.pdf> pp. 1-8.

Kumar, N. And Childers, B., Flexible Instrumentation for Software Dynamic Translation, Workshop on Exploring the Trace Space, during the International Conference of Supercomputing [online], 2003 [retrieved Nov. 2, 2009], Retrieved from Internet: <URL http://www.naveenkumar.org/papers/traces_workshop-03.pdf> pp. 1-10.

http://rogue.colorado.edu/pin/index.html, Pin-A Dynamic Binary Instrumentation Tool, Dec. 8, 2005, 1 page.

Reddi et al., "Pin: A Binary Instrumentation Tool for Computer Architecture Research and Education," Workshop on Computer Architecture Education 2004 (WCAE-04), Munich, Germany, Jun. 19, 2004, 8 pages.

Luk et al., "Pin: Building Customized Program Analysis Tools with Dynamic Instrumentation," ACM SIGPLAN 2005 Conference on Programming Language Design and Implementation (PLDI), Jun. 12-15, 2005, 11 pages.

Patil et al., "Pinpointing Representative Portions of Large Intel Itanium Programs with Dynamic Instrumentation," 37th Annual IEEE/ACM International (MICRO-37 2004), 12 pages.

Luk et al., "Pin: Building Program Analysis Tools with Dynamic Instrumentation, Intel Corporation," Dec. 12, 2005, 15 pages.

* cited by examiner

COMPUTER OPERATING SYSTEM DATA MANAGEMENT

FIELD OF THE INVENTION

The present invention relates to methods of computer operating system data management, to computing platforms for computer operating system data management, to computer programs including instructions configured to enable computer operating system data management, to computer operating systems arranged to perform operating system data management, to a computer operating system data management method, and, to computer operating system data management apparatus.

BACKGROUND TO THE INVENTION

Data management is increasingly important as widespread access to public computer networks facilitates distribution of data. Distribution of data over public computer networks may be undesirable when the data in question comprises sensitive, confidential, copyright or other similar information.

A computer operating system can typically monitor input of data to a process or output of data by a process and apply appropriate management restrictions to these operations. Exemplary restrictions may prevent write operations to a public network, or to external memory devices for data having certain identifiable characteristics. However, manipulation of data within a process can not be monitored by the operating system. Such manipulation may modify the identifiable characteristics of data, and thus prevent the operating system from carrying out effective data management.

Particular problems arise when different types of data are assigned different levels of restriction, and processes involving data from different levels of restriction are run alongside one another. An operating system cannot guarantee that the different types of data have not been mixed. To maintain a desired level of restriction for the most restricted data in these circumstances, this level of restriction must be applied to all data involved in the processes. Consequently, data can only be upgraded to more restricted levels, leading to a system in which only highly trusted users/systems are allowed access to any data.

It is an aim of preferred embodiments of the present invention to overcome at least some of the problems associated with the prior art, whether identified herein, or otherwise.

SUMMARY OF THE INVENTION

According to the present invention in a first aspect, there is provided a method of computer operating system data management comprising the steps of:
  (a) associating data management information with data input to a process; and
  (b) regulating operating system operations involving the data according to the data management information.

By associating data management information at the operating system level greater security and flexibility is obtained; features that are often mutually exclusive.

Suitably, supervisor code administers the method by controlling the process at run time.

Suitably, the step (a) comprises associating data management information with data as the data is read into a memory space.

Suitably, the step (a) comprises associating data management information with at least one data sub-unit as data is read into a memory space from a data unit comprising a plurality of data sub-units.

Suitably, the step (a) comprises associating data management information with each independently addressable data unit that is read into the memory space.

Suitably, the data management information is written to a data management memory space under control of the supervisor code.

Suitably, the supervisor code comprises state machine automatons arranged to control the writing of data management info to the data management memory space.

Suitably, the step (b) comprises sub-steps (b1) identifying an operation involving the data; (b2) if the operation involves the data and is carried out within the process, maintaining an association between an output of the operation and the data management information; and (b3) if the operation involving the data includes a write operation to a location external to the process, selectively performing the operation dependent on the data management information.

Suitably, the step (b1) comprises: analysing process instructions to identify operations involving the data; and, providing instructions relating to the data management information with the operations involving the data.

Suitably, the process instructions are analysed as blocks, each block defined by operations up to a terminating condition.

Suitably, code of an application is analysed statically in order to create a control flow graph.

Suitably, the code is analysed before load time.

Suitably, the code is analysed at load time.

Suitably, code of an application is instrumented to identify an entry point of a conditional structure in the code and an exit point of the conditional structure, and in which the entry points and exit points are identified from the control flow graph.

Suitably, the conditional structure includes a conditional expression, a process has a tag associated with a program counter stack and when the entry point of a conditional structure is identified at run-time, a current tag is pushed further on the program counter stack, and a new tag associated with the conditional expression is added to the front of the counter stack.

Suitably, when the exit point of a conditional structure is identified at run time, the tag from the entry point of the conditional structure is returned to the front of the counter stack.

Suitably, during all operations from an entry of the conditional structure, the tags of the locations in branching expressions are updated according to the tag of the program counter stack.

According to the present invention in a second aspect, there is provided a computing platform for operating system data management, the computing platform comprising a data management unit, the data management unit arranged to associate data management information with data input to a process, and regulate operating system operations involving the data according to the data management information.

Suitably, the computing platform further comprises a memory space, the computing platform arranged to load the process into the memory space and run the process under the control of the data management unit.

Suitably, the data management information is associated with at least one data sub-unit as data is input to a process from a data unit comprising a plurality of sub-units.

Suitably, the data management information is associated with each independently addressable data unit.

Suitably, the data management unit comprises part of an operating system kernel space.

Suitably, the operating system kernel space comprises a tagging driver arranged to control loading of a supervisor code into the memory space with the process.

Suitably, the supervisor code controls the process at run time to administer the operating system data management unit.

Suitably, the supervisor code is arranged to analyse instructions of the process to identify operations involving the data, and, providing instructions relating to the data management information with the operations involving the data.

Suitably, the memory space further comprises a data management information area under control of the supervisor code arranged to store the data management information.

Suitably, the data management unit comprises a data filter arranged to identify data management information associated with data that is to be read into the memory space.

Suitably, the data filter is arranged to associate data management information with data read into the memory space from predetermined sources, or alternatively is arranged to associate default data management information with data read into the memory space.

Suitably, the data management unit further comprises a tag management module arranged to allow a user to specify data management information to be associated with data.

Suitably, the data management unit comprises a tag propagation module arranged to maintain an association with the data that has been read into the process and the data management information associated therewith.

Suitably, the tag propagation module is arranged to maintain an association between an output of operations carried out within the process and the data management information associated with the data involved in the operations.

Suitably, the tag propagation module comprises state machine automatons arranged to maintain an association between an output of operations carried out within the process and the data management information associated with the data involved in the operations.

Suitably, code of an application is instrumented to identify an entry point of a conditional structure in the code and an exit point of the conditional structure, the computing platform further comprising a static code analyser to identify conditional branch entry and exit points and a conditional tag propagator for run-time propagation of tags associated with data storage locations included in the conditional structure.

According to the present invention in a third aspect, there is provided an operating system data management method comprising the step of: identifying data having data management information associated therewith when the data is to be read into a memory space.

Suitably, the method further comprises the step of: associating data management information with the data if the data is identified as having no data management information associated therewith.

Suitably, the data management information associated with data is read into the memory space with the data.

Suitably, the method further comprises the step of: maintaining an association between the data and the data management information when the data is involved in operations within the process, and associating data management information with other data resulting from operations involving the data.

Suitably, the step of an association between the data and the data management information when the data is involved in operations within the process, and associating data management information with other data resulting from operations involving the data.

Suitably, the method further comprises the step of: examining the data management information when the data is to be involved in an operation external to the process, and allowing the operation if it is compatible with the data management information.

Suitably, the operation is blocked if it is not compatible with the data management information.

Suitably, the operation external to the process is compatible with the data management information subject to including the associated data management information with an output of the operation.

Suitably, the data management information identifies a set of permitted operations.

According to the present invention in a fourth aspect, there is provided an operating system data management apparatus comprising a data filter arranged to identify data having data management information associated therewith when that data is read into a memory space.

Suitably, the data filter comprises part of a data management unit, and is arranged to associate data management information with the data if the data is identified as having no data management information associated therewith.

Suitably, data management unit is arranged to read the data management information associated with data into the memory space with the data.

Suitably, the data management unit comprises a tag propagation module arranged to maintain an association between the data and the data management information when the data is involved in operations within the process, and to associate data management information with other data resulting from operations involving the data.

Suitably, the tag propagation module comprises state machine automatons arranged to maintain an association between the data and the data management information when the data is involved in operations within the process, and to associate data management information with other data resulting from operations involving the data.

Suitably, the tag propagation module is arranged to examine the data management information when the data is to be involved in an operation external to the process, and cause the operation to be allowed if it is compatible with the data management information.

Suitably, the tag propagation module is arranged to cause the operation to be blocked if the operation is not compatible with the data management information.

Suitably, the tag propagation module is arranged to perform the operation external to the process subject to including the associated data management information with an output of the operation.

Suitably, the data management information identifies a set of permitted operations.

According to the present invention in a fifth aspect, there is provided a computer program including instructions configured to enable operating system data management in accordance with the method of operating system data management of the first aspect of the present invention, or the operating system data management method according to the third aspect of the present invention.

According to the present invention in a sixth aspect, there is provided a method of modifying computer code of an application, the method comprising the steps of identifying conditional branches in the code and instrumenting the code to provide information regarding the entry and exit points of the conditional structures.

Suitably, the modification is carried out before load time.

Suitably, the modification is carried out at load time.

Suitably, the method further comprises the step of creating a control flow graph representation of the code and analysing the conditional flow graph to identify conditional branches in the code.

According to the present invention in a seventh aspect, there is provided an operating system comprising an application code modifying unit arranged to perform the method of operating system data management of the first aspect of the present invention or the operating system data management method of the third aspect of the present invention.

BRIEF DESCRIPTION OF THE DRAWINGS

For a better understanding of the invention, and to show how embodiments of the same may be carried into effect, reference will now be made, by way of example, to the accompanying diagrammatic drawings in which.

DESCRIPTION OF THE PREFERRED EMBODIMENTS

Data management in the form of data flow control can offer a high degree of security for identifiable data. Permitted operations for identifiable data form a security policy for that data. However, security of data management systems based on data flow control is compromised if applications involved in data processing can not be trusted to enforce the security policies for all data units and sub-units to which the applications have access. In this document, the term "process" relates to a computing process. Typically, a computing process comprises the sequence of states run through by software as that software is executed.

Figure 1:
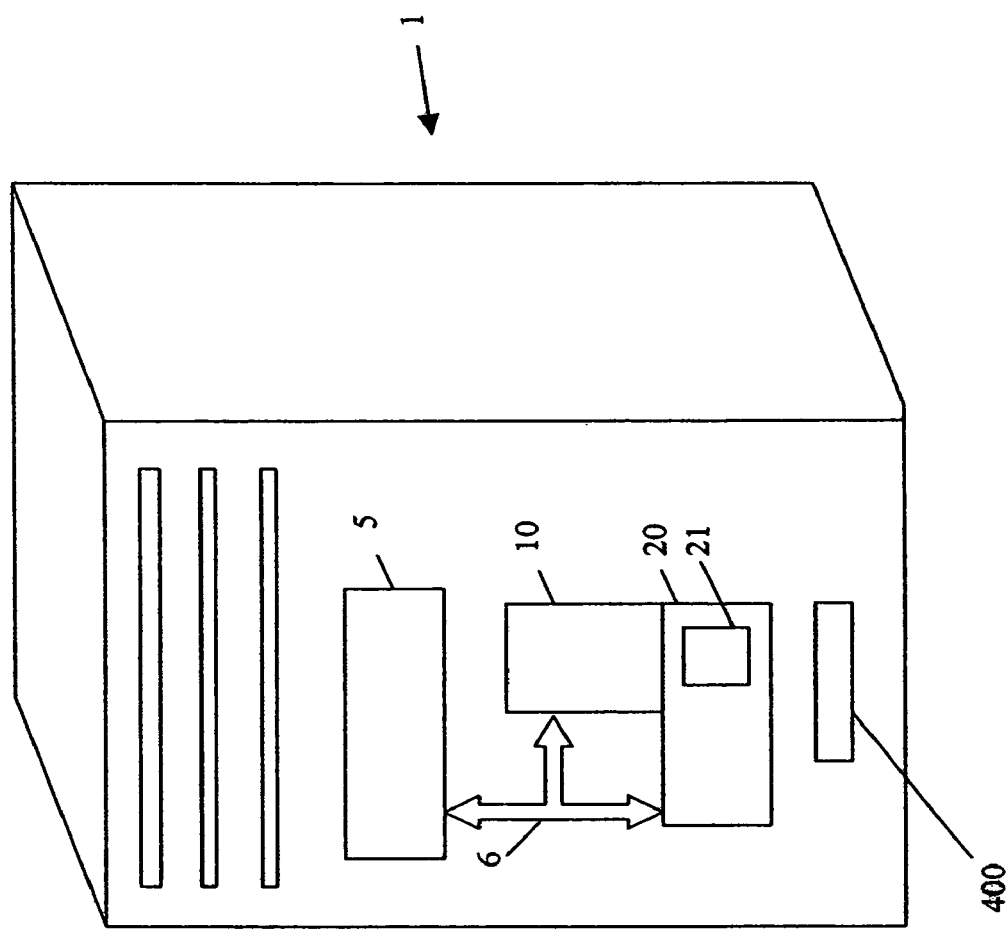
FIG. 1 shows a computing platform for computer operating system data management according to the present invention.

FIG. 1 shows a computing platform 1 for computer operating system data management comprising, a processor 5, a memory space 10, an OS kernel space 20 comprising a data management unit 21 and a disk 30. The memory space 10 comprises an area of memory that can be addressed by user applications. The processor 5 is coupled to the memory space 10 and the OS kernel space 20 by a bus 6. In use, the computing platform 1 loads a process to be run on the processor 5 from the disk 30 into the memory space 10. It will be appreciated that the process to be run on the processor 5 could be loaded from other locations. The process is run on the processor under the control of the data management unit 21 such that operations involving data read into the memory space 10 by the process are regulated by the data management unit 21.

The data management unit 21 regulates operations involving the data according to data management information associated with the data as it is read into the memory space 10.

The data management unit 21 propagates the data management information around the memory space 10 as process operations involving that data are carried out, and prevents the data management information from being read or written over by other operations. The data management unit includes a set of allowable operations for data having particular types of data management information therewith. By inspecting the data management information associated with a particular piece of data, the data management unit 21 can establish whether a desired operation is allowed for that data, and regulate the process operations accordingly.

Figure 2:
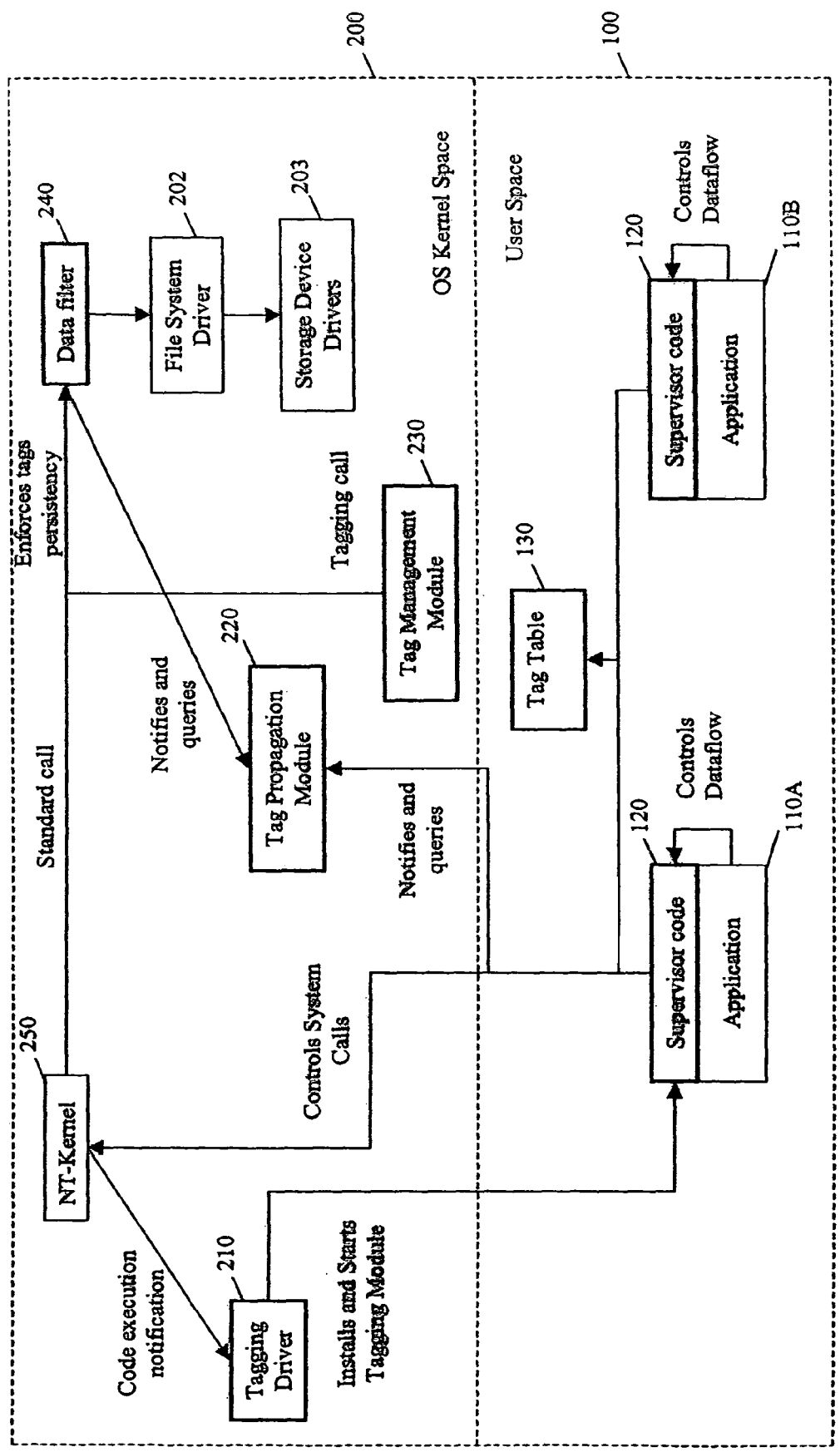
FIG. 2 shows a first operating system data management architecture suitable for use in the computing platform of FIG. 1.

FIG. 2 shows an example operating system data management architecture comprising an OS kernel space and a memory space suitable for use in the computing platform of FIG. 1. The example architecture of FIG. 2 enables regulation of operations involving data read into a memory space by enforcing data flow control on applications using that data. The example architecture of FIG. 2 relates to the Windows NT operating system. Windows NT is a registered trade mark of Microsoft Corporation.

FIG. 2 shows a memory space comprising a user space 100 and an OS kernel space 200. The user space 100 comprises application memory spaces 110A, 110B, supervisor code 120A, 120B, and a tag table 130. The OS kernel space 200 comprises a standard NT kernel 250, file system driver 202 and storage device drivers 203. The OS kernel space 200 further comprises a tagging driver 210, a tag propagation module 220, and a tag management module 230 and a data filter 240.

Preferred embodiments of the present invention propagate information flow control labels or tags with data at run time. A tag of an object is changed when a value flows to an object in the process. However, it is also possible to derive information about objects involved in a process implicitly arising from conditional statements of the type "if", "while", "for" and "do while". This type of information flow is easily traceable at the programming language level, but at run-time the full program flow cannot be analysed so it is impractical to attempt to detect all data dependent on such conditionals while the process executes.

By way of example, if in an executable program the value of a variable "a" is determined or affected (e.g. incremented) by the value of another variable "b", some information about "b" can be deduced from the value of "a".

Figure 3:
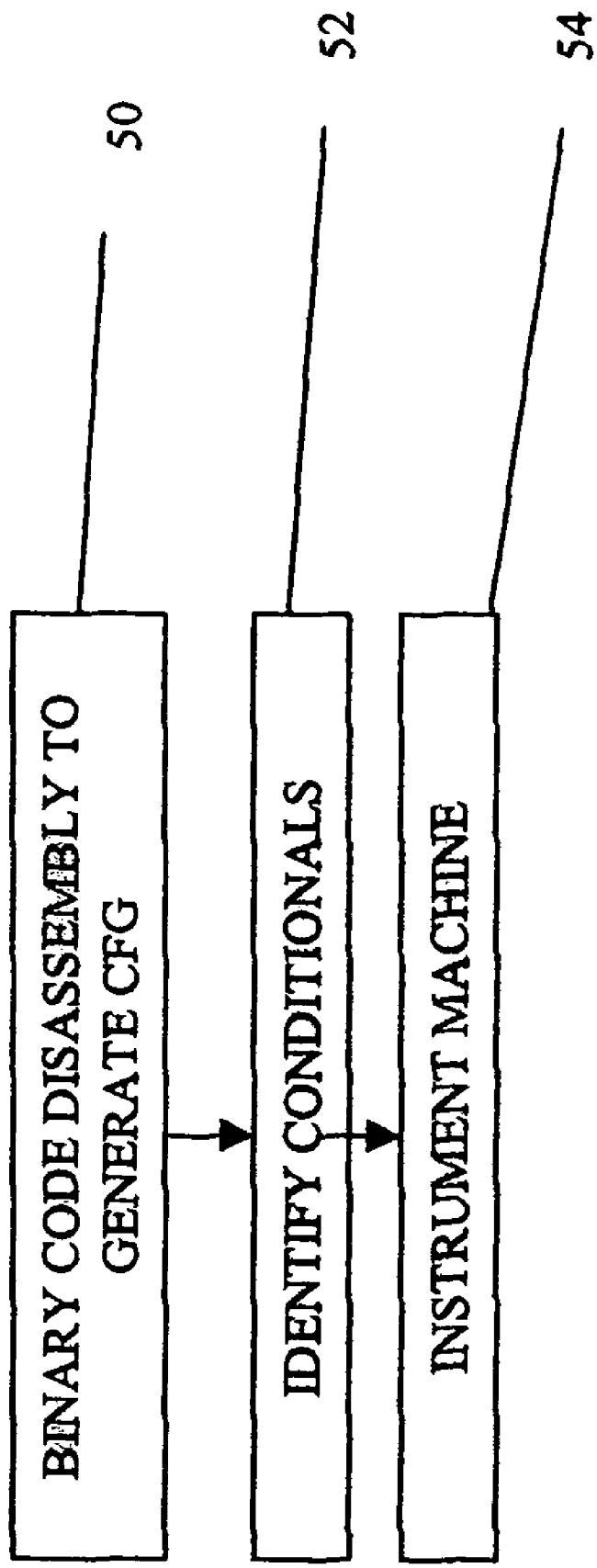
FIG. 3 shows a static code analysis method for use with the present invention.

Accordingly, to address this problem, it is proposed to undertake a static code analysis to generate information about the executable program usable at run-time. In order to do so, with reference to FIG. 3 of the drawings that follow, a static code analysis method is described in which in step 50 binary code disassembly is used to construct a control flow graph (CFG) that represents an abstract structure of the machine code of the executable program. Once the CFGs have been constructed, the basic blocks can be analysed for conditional jumps and loops.

Figure 4:
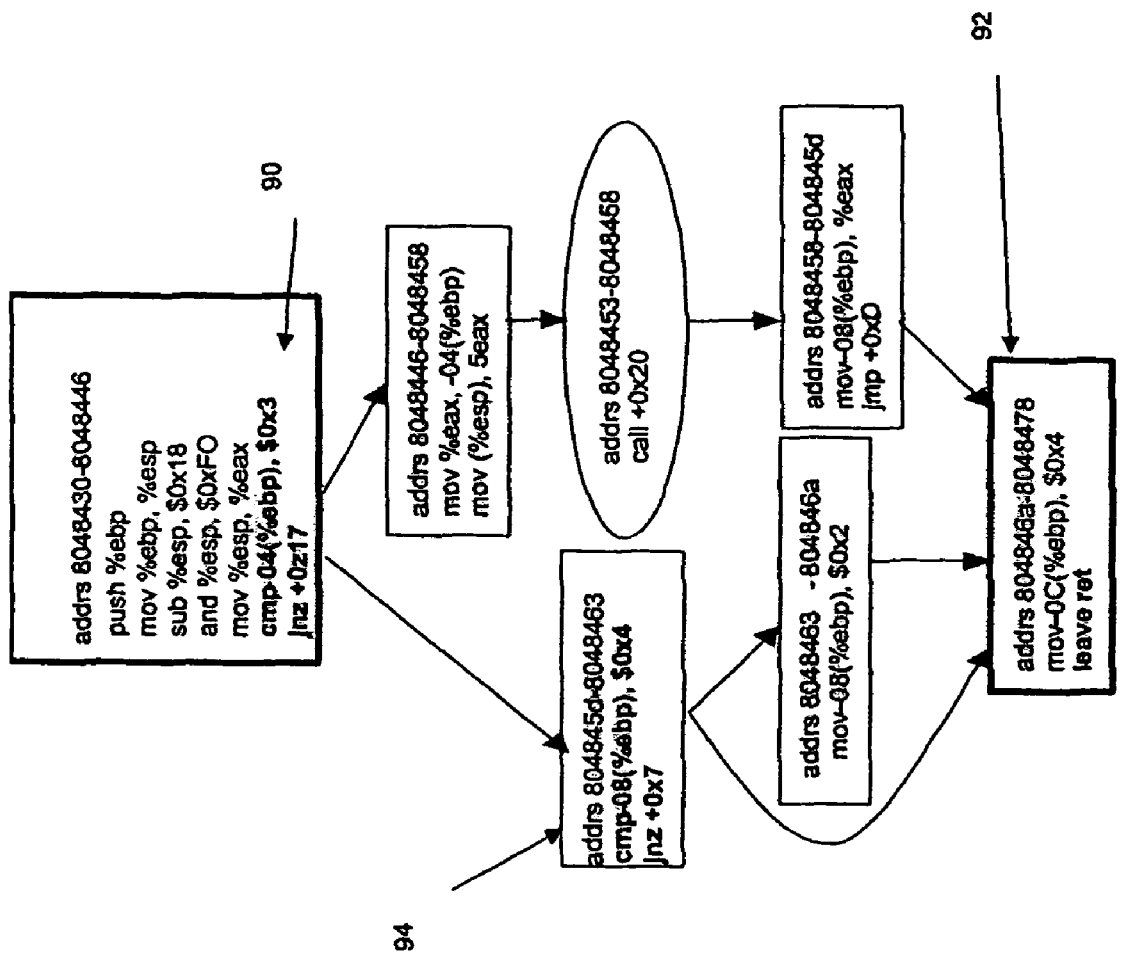
FIG. 4 shows a control flow graph with reference to FIG. 3.

In a CFG conditional structures have the useful property of having a single beginning point at which the control starts and a single exit point at which the control leaves. By way of example, with reference to FIG. 4, a CFG is shown in which two conditional structures are shown, one embedded in the other. A first conditional structure has an entry point 90 and an exit point 92. A second conditional structure has an entry point 94 and the same exit point 92.

All branches following a conditional have an implicit flow of information from the conditional. At the machine code level this is the value set in a particular memory or register location. Therefore, when calculating the tags for branches following a conditional it is necessary to take into account the tag of the location in that conditional.

In order to have the control flow at run-time, further instrumentation code is added to the machine code of the executable program. In step 52 of FIG. 3, code blocks affected by conditionals are identified from the CFG. During the static analysis, the code is then instrumented (step 54) to provide additional information about the execution path taken. This includes entry and exit points of conditional structures, as well as of the blocks within the conditional branches. A tag of a particular conditional is no longer relevant when the process flow reaches the immediate forward denominator node of that conditional branch node in the CFG.

The CFG construction and static code instrumentation can be performed ahead of time or at least at local time to reduce run-time performance overheads. There may be scenarios in which run-time performance overheads are not an issue and these steps can then be carried out at run-time if desired.

When an application is to be run in the user space 100, information comprising the application code along with any required function libraries, application data etc. is loaded into a block of user memory space comprising the application memory space 110 under the control of the NT kernel 250. The tagging driver 210 further appends supervisor code to the application memory space 110 and sets aside a memory area for data management information. This memory area comprises the tag table 130.

In preference to allowing the NT kernel 250 to run the application code, the tagging driver 210 receives a code execution notification from the NT kernel 210 and runs the supervisor code 120

When run, the supervisor code 120 scans the application code starting from a first instruction of the application code, and continues through the instructions of the application code until a terminating condition is reached. A terminating condition comprises an instruction that causes a change in execution flow of the application instructions. Example terminating conditions include jumps to a subroutines, interrupts etc. A portion of the application code between terminating conditions comprises a block of code.

The block of code is disassembled, and data management instructions are provided for any instructions comprising data read/writes to the memory, disk, registers or other functional units such as logic units, or to other input/output (I/O) devices. The data management instructions may include the original instruction that prompted provision of the data management instructions, along with additional instructions relating to data management. Once a block of the application code has been scanned and modified, the modified code can be executed. The scanning process is then repeated, starting with the first instruction of the next block.

At a first system call of the application code relating to a particular piece of data, typically a read instruction, the first data management instruction associates data management information with the data. The data management information comprises a tag held in the tag table 130. The tag table 130 comprises a data management information memory area which can only be accessed by the supervisor code 120. Preferably, a tag is applied to each independently addressable unit of data—normally each byte of data. By applying a tag to each independently addressable piece of data all useable data is tagged, and, maximum flexibility regarding the association of data with a tag is maintained. A tag may preferably comprise a byte or other data unit.

A tag identifies a data management policy to be applied to the data associated with that tag. Different data management policies may specify a number of rules to be enforced in relation to data under that data management policy, for example, "data under this policy may not be written to a public network", or "data under this policy may only be operated on in a trusted environment". When independently addressable data units have their own tags it becomes possible for larger data structures such as e.g. files to comprise a number of independently addressable data units having a number of different tags. This ensures the correct policy can be associated with a particular data unit irrespective of its location or association with other data in a memory structure, file structure or other data structure. The data management policy to be applied to data, and hence the tag, can be established in a number of ways.

(1) Data may already have a predetermined data management policy applied to it, and hence be associated with a pre-existing tag. When the NT kernel 250 makes a system call involving a piece of data, the data filter 240 checks for a pre-existing tag associated with that data, and if a pre-existing tag is present notifies the tag propagation module 220 to include the tag in the tag table 130, and to maintain the association of the tag with the data. Any tag associated with the data is maintained, and the data keeps its existing data management policy.

If there is no tag associated with the data, the following tag association methods can be used.

(2) Data read from a specific data source can have a predetermined data management policy corresponding to that data source applied to it. The data filter 240 checks for a data management policy corresponding to the specific data source, and if a predetermined policy does apply to data from that source notifies the tag propagation module 220 to include the corresponding tag in the tag table 130 and associate the tag with the data. For example, all data received over a private network from a trusted party can be associated with a tag indicative of the security status of the trusted party.

(3) When data has no pre-existing tag, and no predetermined data management policy applies to the data source from which the data originates, the tag management module 230 initiates an operating system function that allows a user to directly specify a desired data management policy for the data. The desired data management policy specified by the user determines the tag associated with the data. To ensure that the operating system function is authentic and not subject to subversion, it is desired that the operating system function of the tag management module 230 is trusted. This trust can be achieved and demonstrated to a user in a number of ways, as will be appreciated by the skilled person.

(4) Alternatively, when data has no pre-existing tag, and no predetermined data management policy applies to the data source from which the data originates a default tag can be applied to the data.

Data management instructions are provided for subsequent instructions relating to internal processing of the tagged data. The data management instructions cause the tag propagation module 220 to maintain the association between the data and tag applied to it. Again, the data management instructions may include the instructions relating to internal processing of the data along with additional data management instructions. If the data is modified, e.g. by a logical or other operations, the relevant tag is associated with the modified data. Data management instructions for maintaining the association of tags with data as that data is manipulated and moved can be implemented using relatively simple state machine automatons. These automatons operate at the machine code level to effectively enforce the association and propagation of tags according to simple rules. For example, if data is moved the tag associated with the data at the move destination should be the same as the tag associated with the data before the move. In this simple example, any tag associated with the data at the move destination can be overwritten by the tag associated with the incoming data. Other automatons can be used to combine tags, swap tags, extend tags to other data, leave tags unchanged etc. dependent on the existing data tag(s) and type of operation to be carried out on the data.

The supervisor code 120 manages the tags in the tag table. A simple form of tag management comprises providing a data tag table that is large enough to accommodate a tag for each piece of tagged data. This results in a one-to-one relationship between the data in the application memory space 110, and the data tags in the tag table, and a consequent doubling of the overall memory space required to run the application. However, memory is relatively cheap, and the one to one relationship enables simple functions to be used to associate the data with the relevant tag. As an alternative, different data structures can be envisaged for the data management information area, for example, a tag table can identify groups of data having a particular tag type. This may be advantageous when a file of data all associated with a single tag is involved in an operation. When more than one application is loaded in the user space 100, as shown in FIG. 2 with the two application memory spaces 110A,110B, a shared tag table 130 can be used. As already mentioned, different tags can be applied to a separate data units within a file or other data structure. This allows an improved flexibility in subsequent manipulation of the data structure ensuring the appropriate policy is applied to the separate data units.

Data management instructions are also provided for instructions relating to writing of data outside the process (for all the described embodiments of the present invention). The data management instructions may include the instructions relating to writing of data outside the process along with other data management instructions. In this case, the data management instructions prompt the supervisor code 120 to notify the tag propagation module 220 of the tag associated with the data to be written. The system call to the NT kernel 250 is received by the data filter 240. The data filter 240 queries the allowability of the requested operation with the tag propagation module 220 to verify the tag associated with the data to be written, and check that the data management policy identified by the tag allows the desired write to be performed with the data in question. If the desired write is within the security policy of the data in question, it is performed, with the data filter 240 controlling the file system driver 202 to ensure that the storage device drivers 203 to enforce the persistence of the tags with the stored data. If the data is not permitted to be written as requested, the write operation is blocked. Blocking may comprise writing random bits to the requested location, writing a string of zeros or ones to the requested location, leaving the requested location unaltered, or encrypting the data before writing.

In order to take tags in conditionals into account when new tags are compiled a stack-based mechanism is used. At run-time the program counter (PC) of a process p has a tag p' associated with that counter. The tag reflects the current execution structure of the process and represents the tags of entries to the conditional structures. Thus, whenever a conditional entry point is detected, the current tag p' is pushed further on the stack and the label of a conditional expression c is added, resulting in a new tag based on the tags p' and c'.

If a statement is conditional on the value of n expressions $c_1, \ldots, c'_n$ then the tags of these locations are first combined and the end result combined with p'.

During all operations from the entry point the tags of the locations in branching expressions are updated by taking into account the current tag of the PC.

The tags are updated accordingly for all memory and register locations encountered after the conditional. When the node is reached that, according to the CFG, is the immediate forward denominator of the conditional branch node, the current PC tag is popped off the stack and hence its value is restored to what it was before the conditional was encountered.

At run-time the instrumented machine code is run under a dynamic instruction stream modification framework. This again involves re-writing the machine code but this time, unlike the static analysis, it is done dynamically at run-time to ensure the instrumentations are not bypassed.

When a process reads bytes from a data source (such as a file) into its address space via a system call, the added machine code makes it run an additional system call to determine the kernel maintained tag values for those particular bytes in the data source. These tag values are loaded into the sparse array for the locations within the process address space that the data was read into.

At a certain point, usually at the time of a system call, the tagging/modelling module is invoked to update the tag values of the memory and register locations within the process. Given previously known tags for these locations and given a trace of machine code instructions (such as mov B,A) that cause a write from one area of the process address space (or register) to another area of the address space (or register) as well as instructions (such as add or sub) that cause data to be combined new tag values are computed accordingly.

When a process attempts to write data outside of its address space (via a system call) the operation is re-written so that the process first makes a system call to the kernel passing the tag values of the data it is trying to write. At this point the kernel can be instrumented to check whether any particular policy, such as access control, applies on the passed tag values. In cases when the policy prohibits writes to the intended destination the original system call is skipped over and an error call is returned to the process.

Figure 5:
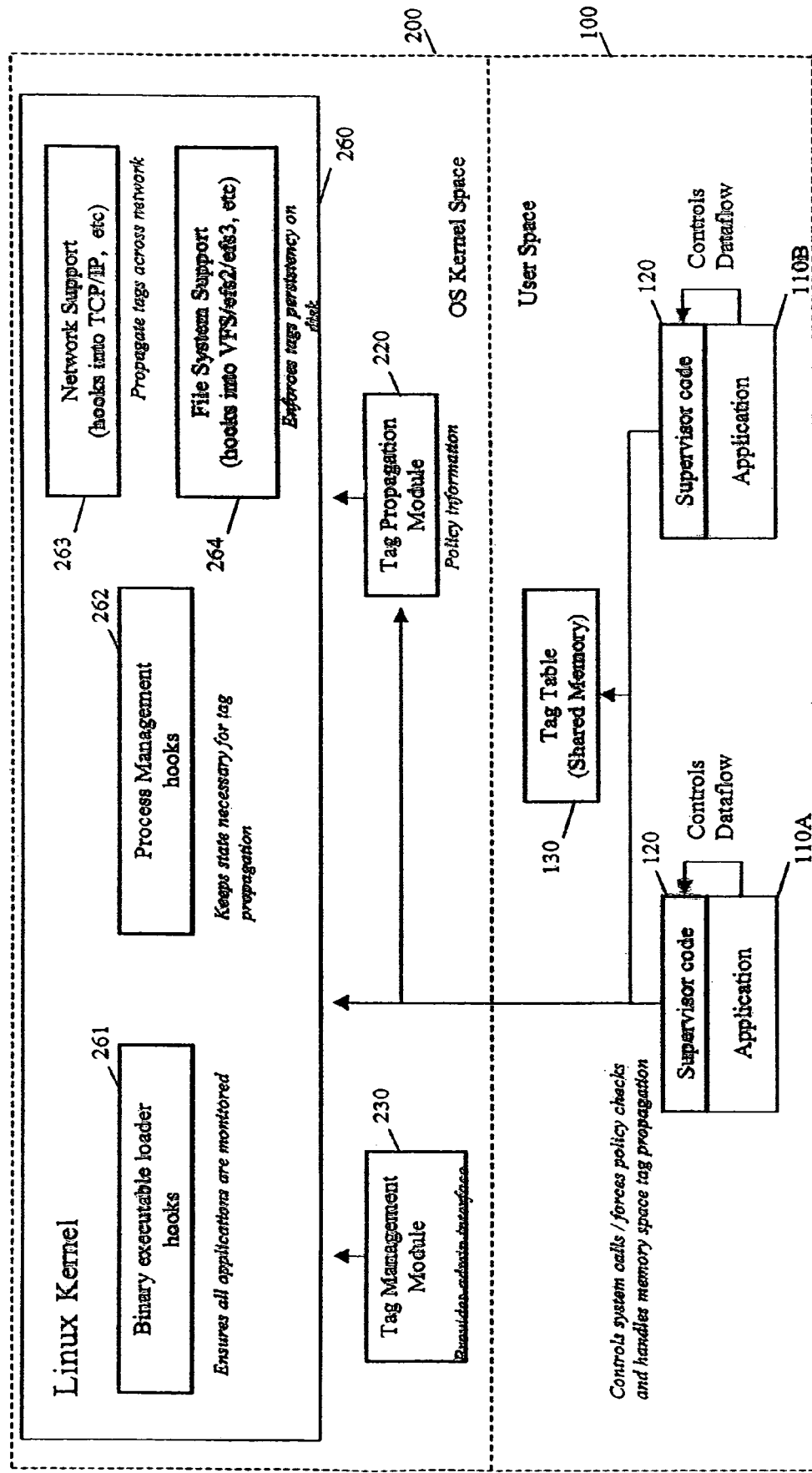
FIG. 5 shows a second operating system data management architecture suitable for use in the computing platform of FIG. 1.

A second example operating system data management architecture suitable for use in the computing platform of FIG. 1 is shown in FIG. 5. The example operating system data management architecture of FIG. 3 relates to the Linux operating system.

FIG. 5 shows a user space 100 and an OS kernel space 200. The user space 100 comprises application memory spaces 110, 110B, supervisor code 120A,120B, and a tag table 130. The OS kernel space 200 comprises a tag propagation module 220, a tag management module 230, along with a Linux kernel 260 comprising an executable loader module 261, a process management module 262, a network support module 263 and a file system support module 264.

As the Linux operating system is open source, a number of the functions required to implement the data management system can be incorporated into the existing functional blocks of the kernel. In the example architectures of FIG. 5, the executable loader module 261, the process management module 262, the network support module 263 and the file system support module 264 are be modified versions of those included in a standard Linux kernel, as will be described below.

As before, the supervisor code 120 controls system calls, handles memory space tag propagation, and instructs policy checks in the OS kernel space 200 when required. Also as before, the tag propagation module 220 maintains policy information relating to allowable operations within the policies, and the tag management module 230 provides an administrative interface comprising an operating system function that allows a user to directly specify a desired data management policy for the data.

The operation of the Linux kernel 260 allows the data management architectures shown to carry out data flow control. The executable loader 261 includes a tagging driver that ensures applications are run under the control of the supervisor code 120. The process management module 262 carries out process management control to maintain the processor running the application or applications in a suitable state to enable tag association, monitoring and propagation. The network support module 263 enables the propagation of tags with data across a network, and the file system support module 264 enables the propagation of tags with data on disk. The network support module 263 and the file system support module 264 together provide the functionality of the data filter of FIG. 2. Again, state machine based automation can be used to perform basic tag association, monitoring and propagation functions at a machine code level.

The modifications to the executable loader module 261, the process management module 262, the network support module 263 and the file system support module 264 can be easily implemented with suitable hooks.

Figure 6:
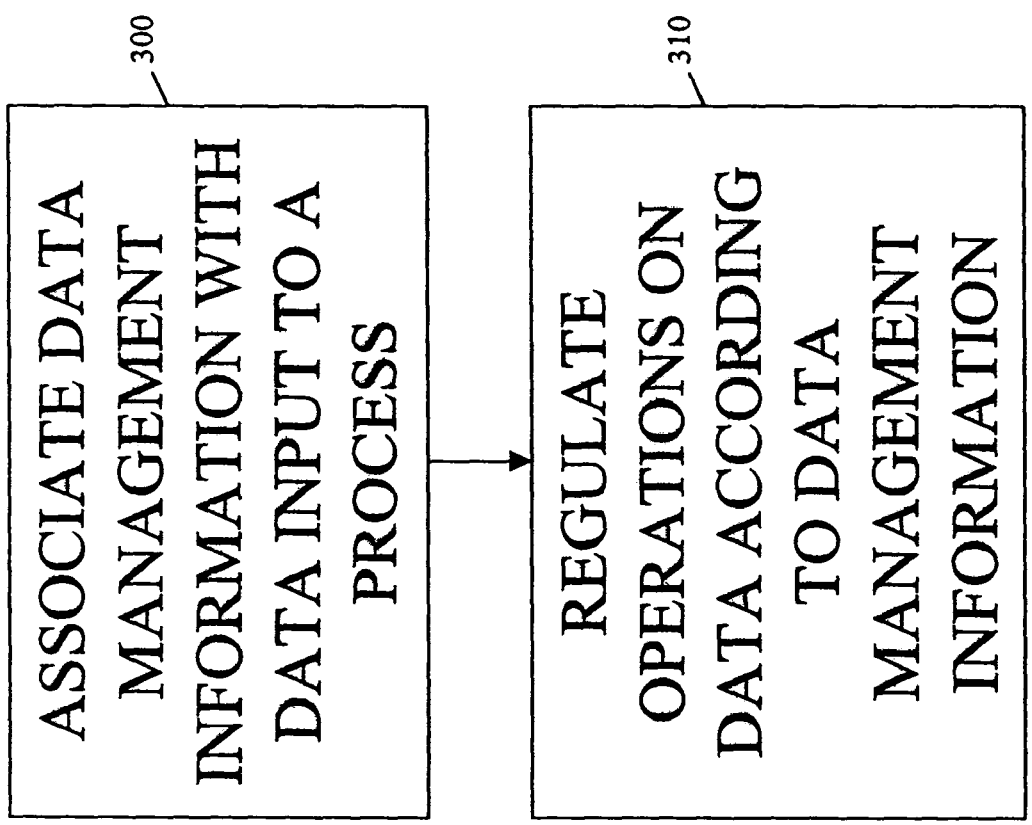
FIG. 6 shows a flow diagram comprising steps involved in operation of the above described figures.

FIG. 6 shows a flow diagram outlining basic steps in an example method of operating system data management.

The method comprises a first step 300 of associating data management information with data input to a process; and a second step 310 of regulating operations involving the data input to the process in the first step 300 according to the data management information associated with the data in the first step 300. The basic first and second steps 300,310 are further expanded upon in the flow diagram of FIG. 7.

Figure 7:
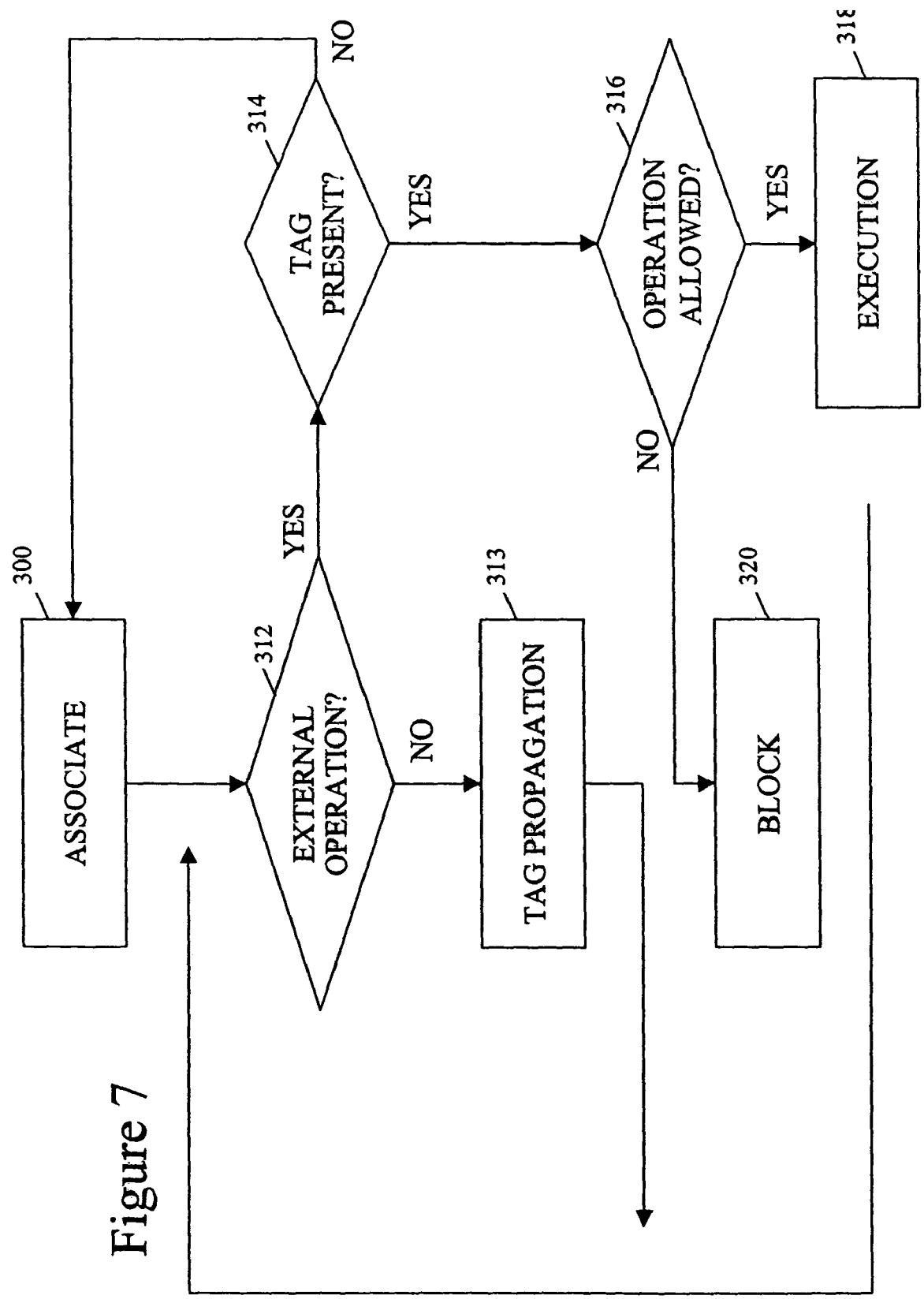
FIG. 7 shows a flow diagram comprising further steps involved as part of the FIG. 6 operation.

FIG. 7 shows a flow diagram outlining further steps in an example method of operating system data management.

The method of FIG. 7 starts with an "external operation?" decision 312. If data on which the method is performed is read into memory space associated with a process from a location external to the memory space associated with the process, the outcome of the "external operation?" decision 312 is YES. Furthermore, if the data within the process is to be written to an external location, the outcome of the "external operation?" decision 312 is also YES. Following a positive decision at the "external operation?" decision, the method moves to the "tag present?" decision 314. Operations involving data within the process result in a negative outcome at the "external operation?" decision 312.

At the "tag present?" decision 314, it is determined whether the data involved in the operation has data management information associated with it. If the data has no data management information associated with it, the association step 300 is performed, and the method returns to the "external operation?" decision 312.

In the association step 300, data management information is associated with the data in question. This association can be carried out by any of the methods described earlier, or by other suitable methods.

Following a positive decision at the "tag present?" decision 314, the method moves to the "operation allowed?" decision 316. At this decision, the data management information associated with the data is examined, and its compatibility with the specified external operation identified in the "external operation?" decision 312 is established.

If the data management information is compatible with the external operation, it is carried out in the execution step 318. Following the execution step 318, the method returns to the "external operation?" decision 312. Alternatively, if the data management information is not compatible with the external operation, it is blocked in the blocking step 318. Blocking in step 318 can comprise any of the methods described earlier, or by other suitable methods.

Any operations identified at the "external operation?" decision 312 as internal operations are carried out, with association of the data involved in the operation with the relevant data management information maintained in the tag propagation step 313.

Including the data management functionality with an operating system provides a first level of security, as operating system operation should be relatively free from security threatening bugs compared to either commercial or open source application software. Furthermore, if the operating system allows trusted operation after a secure boots, for example as provided for by the Trusted Computing Platform Alliance (TCPA) standard, the data management functionality can also form part of the trusted system. This enables the data management functions to also form part of the trusted system, enabling e.g. digital rights management or other secrecy conditions to be enforced on data.

It is possible that the computing platform for operating system data management could refuse to open or write data with a pre-existing tag unless the computing platform is running in a trusted mode, adding to the enforceability of data flow control under the data management system. This is particularly useful when encrypted data is moved between trusted computing platforms over a public network.

An operating system data management method, and a computing platform for operating system data management have been described. The data management method and computing platform allow a supervisor code to monitor data flow into and out of an application using data management information. As data is used within an application process, the data management information is propagated with the data. This allows the supervisor code to ensure that only external write operations which are compatible with a data management policy for the data are performed. The data flow monitoring and enforcement enabled by the data management method and computing platform facilitate the construction of systems that support digital rights management and other data privacy functions, but avoid the problems associated with system wide approaches to data flow control systems. In particular, the granularity provided by associating data management information with data units that are individually addressable rather than with a data structure such as a file of which the individually addressable data units are part offers improved flexibility in how security is enforced. The method and computing platform described do not require source code modification of application and subsequent recompilation. Furthermore, the method and system described can easily be retrospectively implemented in a variety of known operating systems, for example Windows NT and Linux as show herein.

The functionality described above can also be implemented on a virtual machine.

There will now be described a method and apparatus for handling tagged data. These are applicable to the data tagged and propagated as described above as well as to data tagged in other ways, for instance at the file level (i.e. all data in a file having the same tag).

Figure 8:
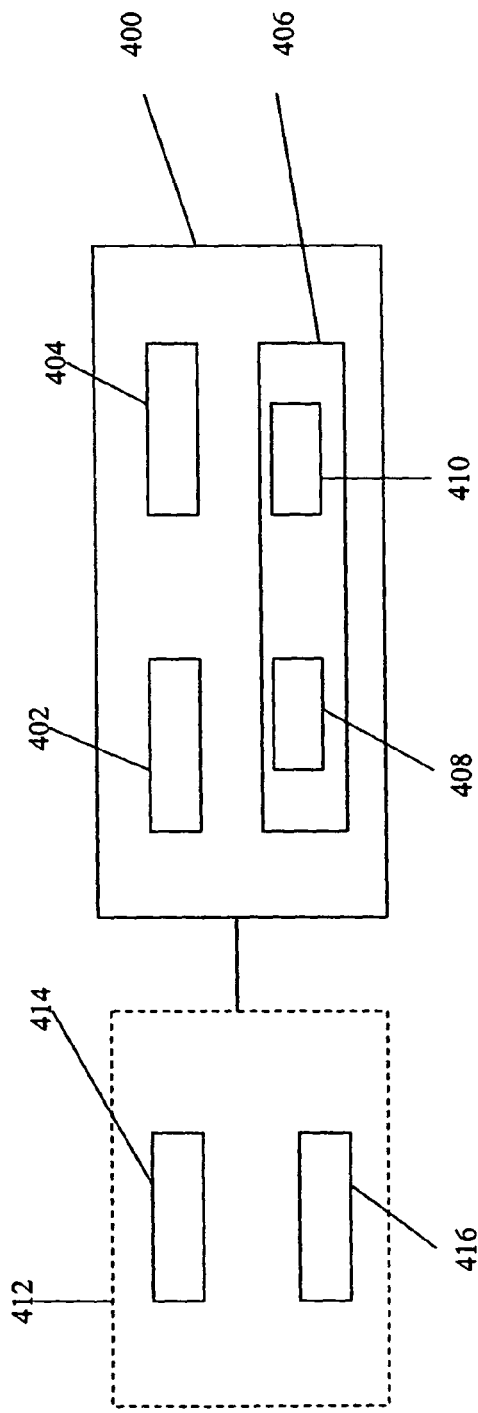
FIG. 8 shows a data handling apparatus according to the present invention.

FIG. 8 of shows a data handling apparatus 400 forming a part of the computing platform 1 shown in FIG. 1. The data handling apparatus 400 comprises a system call monitor 402, a tag determiner 404 and a policy interpreter 406. The policy interpreter 406 comprises a policy database 408 and a policy reconciler 410. Also shown in FIG. 6 are external devices indicated generally at 412, which can be local external devices 414 such as printers, CD writers, floppy disk drives, etc or any device on a network (which can be a local network, a wide area network or a connection to the Internet), such as a printer, another computer, CD writer, etc. The data handling apparatus 400 can be embodied in hardware or software, and in the latter case may be a separate application or more preferably runs at an operating system level.

Additionally, there is shown a conditional detector 418 and a conditional tag propagator 420.

Figure 9:
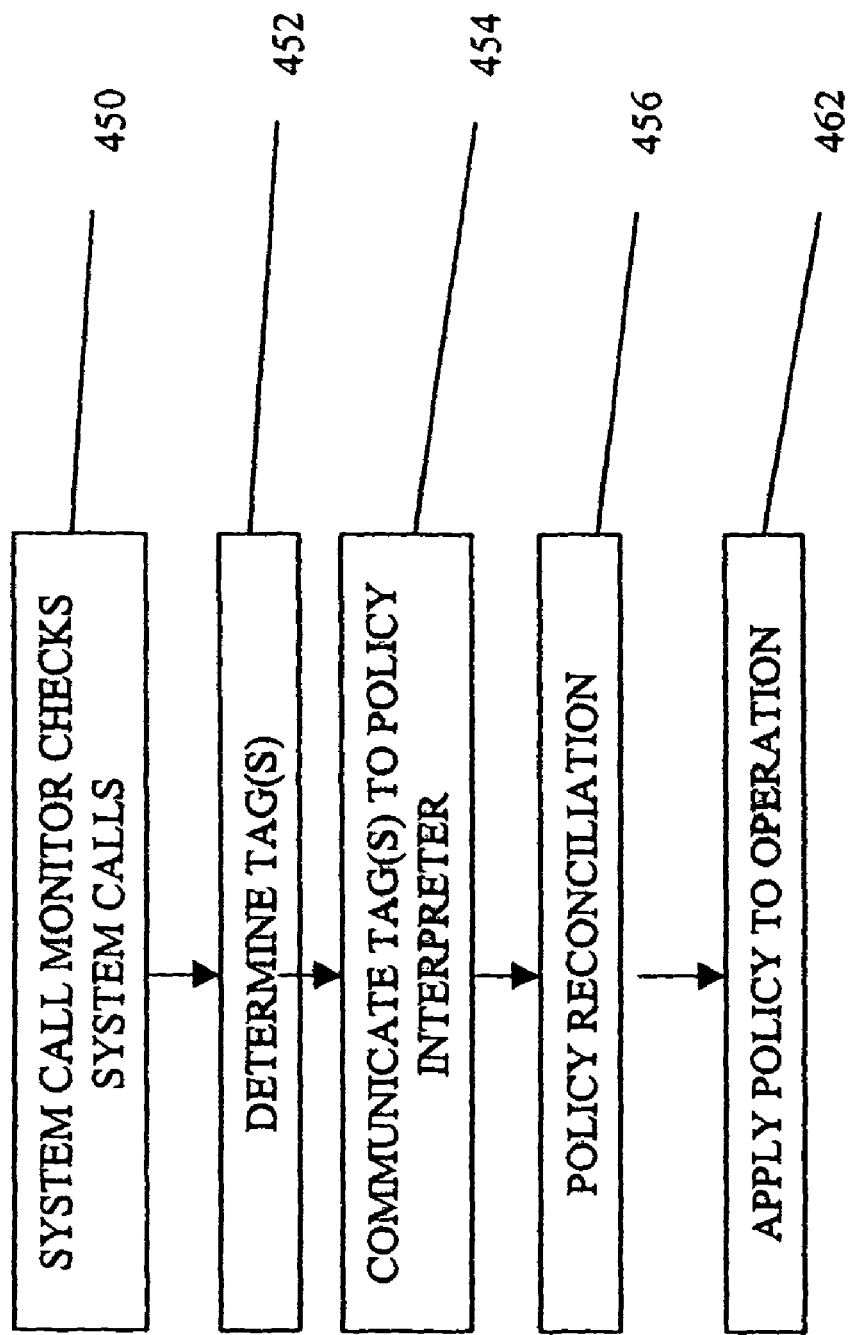
FIG. 9 shows a functional flow diagram of a method of operation of the apparatus of FIG. 8.

Operation of the apparatus shown in FIG. 8 is explained with reference to FIG. 9 which shows a functional flow diagram thereof.

In step 450 the data handling apparatus 400 runs on a computing platform 1 and the system call monitor 402 checks each system call at the kernel layer of the operating system to determine whether it is a system call in relation to which the data handling apparatus 400 is configured to control. Typically the controlled system calls are those involving writes of data to devices (which include writes to network sockets) so that the transfer of data externally of the operating system and computing platform memory can be controlled. The system call monitor 402 implemented at the kernel level keeps track of new file descriptors being created during the process execution that refer to controlled external devices and network sockets. The system call monitor 402 also monitors all system calls where data is written to these file descriptors. Whenever a system call is intercepted that causes data write or send, the process is stopped and both the data and the file descriptor that this data is being written/sent to are examined. The system call monitor 402 has a list of predetermined system calls that should always be denied or permitted. If the intercepted system call falls into this category the system call monitor uses this fast method to permit or deny a system call. If the fast method cannot be used, the system call monitor needs to ask the policy interpreter 406 in user space for a policy decision. Thus either the system call monitor 402 or the tag determiner 404 and policy interpreter 406 can be a means for applying a data handling policy to the system call upon a predetermined system call being detected.

Once a predetermined system call has been detected by system call monitor 402, then in step 452 the tag determiner 404 determines what security tag or tags are associated with the corresponding operation. For the purpose of this explanation of an embodiment of the present invention, it is assumed the system call is of data from a file to a networked device. Using the data tagging described above, a plurality of tags will apply. Using other tagging techniques there may only be one tag associated with a file. For this embodiment it is assumed that there are several tags associated with the data. The tags associated with the data relevant to the action of the system call are communicated to the policy interpreter 406 in step 454.

Figure 10:
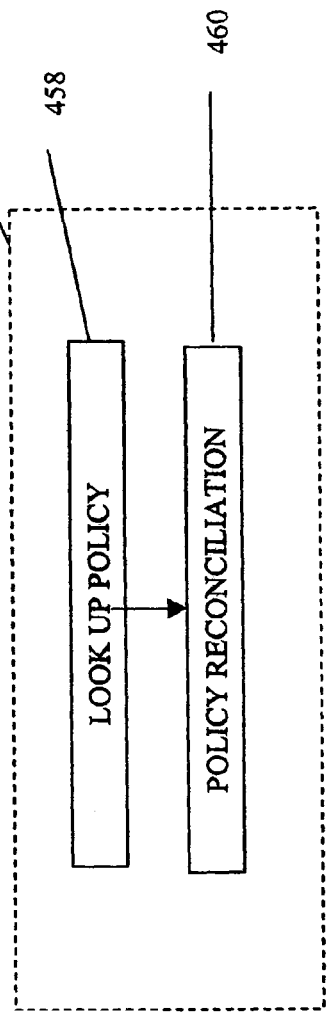
FIG. 10 shows a functional flow diagram of part of the method of FIG. 9.

In step 456, the policy interpreter 406 determines the policy to be applied to the data. Referring to FIG. 10, the sub-steps of step 456 are shown in more detail. In step 458 a policy for each tag is looked up from the policy database 408. Since the so determined policies may be inconsistent, the resultant policies are supplied to policy reconciler 410, which in step 460 carries out a policy reconciliation to generate a policy to apply to the data. The nature of the policy reconciliation is a matter of design choice for a person skilled in the art. At its simplest policy reconciliation will provide that the most restrictive policy derived from all restrictions and requirements of the policies associated with the tags applies, effectively ANDing all the policies. However, many alternatives exist. The policy reconciler may make policy determinations based on the intended destination of the relevant data, which is known from information provided by the system call monitor 402.

Once a reconciled policy has been determined by policy reconciler 410, this is the output from policy interpreter 406 that is returned to system call monitor 402. The system call monitor allows the stopped process to continue execution after it applies the result to the operation in question in step 462 (FIG. 9).

When the conditional tag detector 418 determines from the instrumental machine code that a conditional has been reached, tags are propagated with variables associated with the conditionals in the manner described above by conditional tag propagator 420.

Generally there will be three policy applications. The first will be to permit the operation. The second will be to block the operation. The third will be to permit the operation but to vary it in some way. The main variation is the encryption of the data being transmitted for additional security.

In any data transmission, tags may be propagated as described above.

Thus embodiments of the present invention provide a method of computer operating system data management comprising the steps of: (a) associating data management information with data input to a process; and (b) regulating operating system operations involving the data according to the data management information.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of computer operating system data management comprising:
    associating data management information with data input to a process; and
    regulating operating system operations involving the data according to the data management information by:
    disassembling an application to be executed to obtain machine code; and
    modifying the obtained machine code of the application to include instructions to associate first data management information with a first addressable unit of a file, to associate second data management information with a second addressable unit of the file, and to verify that the data management information indicates that the first addressable unit is authorized to be written by an instruction to write the first addressable unit before the first addressable unit is written.

2. The method of claim 1 wherein supervisor code administers the method by controlling the process at run time.

3. The method of claim 2, wherein the data management information is written to a data management memory space under control of the supervisor code.

4. The method of claim 3 wherein the supervisor code comprises state machine automatons arranged to control the writing of the data management information to the data management memory space.

5. The method of claim 1, wherein, associating the data management information with the data input to the process comprises associating the data management information with the data as the data is read into a memory space.

6. The method of claim 1, wherein associating the data management information with the data input to the process comprises associating the data management information with each independently addressable data unit that is read into the memory space.

7. The method of claim 1, wherein regulating the operating system operation comprises: identifying an operation involving the file; if the operation involves the file and is carried out within the process, maintaining an association between an output of the operation and the first data management information; and if the operation involving the file includes a write operation to a location external to the process, selectively performing the operation dependent on the first data management information.

8. The method of claim 7, wherein identifying the operation comprises: analyzing process instructions to identify the operation involving the file; and, providing instructions relating to the first data management information with the operation involving the file.

9. The method of claim 8, wherein the process instructions are analyzed as blocks, each block defined by operations up to a terminating condition.

10. The method of claim 1, wherein code of an application is analyzed statically in order to create a control flow graph.

11. The method of claim 10, wherein the code is analyzed before load time.

12. The method of claim 10, wherein the code is analyzed at load time.

13. The method of claim 10, wherein code of an application is instrumented to identify an entry point of a conditional structure in the code and an exit point of the conditional structure, and in which the entry points and exit points are identified from the control flow graph.

14. The method of claim 13, wherein the conditional structure includes a conditional expression, a process has a tag associated with a program counter stack and when the entry point of a conditional structure is identified at run-time, a current tag is pushed further on the program counter stack, and a new tag associated with the conditional expression is added to the front of the counter stack.

15. The method of claim 14, wherein when the exit point of a conditional structure is identified at run time, the tag from the entry point of the conditional structure is returned to the front of the counter stack.

16. The method of claim 14, wherein during all operations from an entry of the conditional structure, tags of the locations in branching expressions are updated according to the tag of the program counter stack.

17. A non-transitory computer readable medium storing a computer program including instructions configured to enable operating system data management in accordance with the method of operating system data management of claim 1.

18. An operating system stored on a non-transitory computer readable medium comprising an application code modifying unit to perform the method of operating system data management of claim 1.

19. A computing platform including a processor for operating system data management, the computing platform comprising a data management unit, the data management unit to associate data management information with data input to a process, and to regulate operating system operations involving the data according to the data management information by disassembling an application to be executed to obtain machine code, and modifying the obtained machine code of the application to include instructions to associate first data management information with a first addressable unit of file and second data management information with a second addressable unit of the file and to verify that the data management information indicates that the first addressable unit is authorized to be written by an instruction to write the data before the first addressable unit is written.

20. The computing platform of claim 19, further comprising a memory space, the computing platform arranged to load the process into the memory space and run the process under the control of the data management unit.

21. The computing platform of claim 20, wherein the data management unit comprises a data filter arranged to identify data management information associated with data that is to be read into the memory space.

22. The computing platform of claim 21, wherein the data filter is arranged to associate data management information with data read into the memory space from predetermined sources, or alternatively is arranged to associate default data management information with data read into the memory space.

23. The computing platform of claim 19, wherein the data management information is associated with each independently addressable data unit of the data.

24. The computing platform of claim 19, wherein the data management unit comprises part of an operating system kernel space.

25. The computing platform of claim 24, wherein the operating system kernel space comprises a tagging driver to control loading of supervisor code into the memory space with the process.

26. The computing platform of claim 25, wherein the supervisor code controls the process at run time to administer the operating system data management unit.

27. The computing platform of claim 25, wherein the memory space further comprises a data management information area under control of the supervisor code arranged to store the data management information.

28. The computing platform of claim 24, wherein the supervisor code is arranged to analyze instructions of the process to identify operations involving the data, and, to provide instructions relating to the data management information with the operations involving the data.

29. The computing platform of claim 19, wherein the data management unit further comprises a tag management module to allow a user to specify data management information to be associated with data.

30. The computing platform of claim 19, wherein the data management unit comprises a tag propagation module to maintain an association with the data that has been read into the process and the data management information associated therewith.

31. The computing platform of claim 30, wherein the tag propagation module is to maintain an association between an output of operations carried out within the process and the data management information associated with the data involved in the operations.

32. The computing platform of claim 31, wherein the tag propagation module comprises state machine automatons to maintain an association between an output of operations carried out within the process and the data management information associated with the data involved in the operations.

33. A non-transitory computer readable medium storing a computer program including instructions configured to enable operating system data management in accordance with or the operating system data management method of claim 31.

34. The computing platform of claim 19, wherein code of an application is instrumented to identify an entry point of a conditional structure in the code and an exit point of the conditional structure, the computing platform further comprising a static code analyzer to identify conditional branch entry and exit points and a conditional tag propagator to propagate, at runtime, tags associated with data storage locations included in the conditional structure.

35. An operating system data management method comprising:
disassembling an application to be executed to obtain machine code; and
modifying the obtained machine code of the application to include instructions to identify data having data management information associated therewith when the data is to be read into a memory space, the instructions to identify data having the data management information associated therewith including instructions to associate first data management information with a first addressable unit of a file, to associate second data management information with a second addressable unit of the file, and to verify that the data management information indicates that the first addressable unit is authorized to be written by an instruction to write the first addressable unit before the first addressable unit is written.

36. The method of claim 35, further comprising: associating data management information with the data in response to determining that no data management information associated with the data.

37. The method of claim 35, wherein the data management information associated with data is read into the memory space with the data.

38. The method of claim 35, further comprising: maintaining an association between the data and the data management information when the data is involved in operations within a process, and associating data management information with other data resulting from operations involving the data.

39. The method of claim 38, further comprising: examining the data management information when the data is to be involved in an operation external to the process, and allowing the operation if it is compatible with the data management information.

40. The method of claim 39, wherein the operation is blocked if it is not compatible with the data management information.

41. The method of claim 39, wherein the operation external to the process is compatible with the data management information subject to including the associated data management information with an output of the operation.

42. The method of claim 35, wherein the data management information identifies a set of permitted operations.

43. An operating system stored on a non-transitory computer readable medium comprising an application code modifying unit to perform the operating system data management method of claim 35.

44. An operating system data management apparatus comprising:
a data management unit to associate data management information with data input to a process, and to disassemble an application to be executed to obtain machine code and modify the obtained machine code of the application to include instructions to associate first data management information with a first addressable unit of a file, instructions to associate second data management information with a second addressable unit of the file, and instructions to verify that the data management information indicates that the first addressable unit is authorized to be written by an instruction to write the first addressable unit before the first addressable unit is written; and
a processor to identify data having data management information associated therewith when that data is read into a memory space.

45. The apparatus of claim 44, wherein the processor is to associate data management information with the data if the data is identified as having no data management information associated therewith.

46. The apparatus of claim 44, wherein the processor is arranged to read the data management information associated with the data into the memory space with the data.

47. The apparatus of claim 44, further comprising a tag propagation module to maintain an association between the data and the data management information when the data is involved in operations within the process, and to associate data management information with other data resulting from operations involving the data.

48. The apparatus of claim 47, wherein the tag propagation module comprises state machine automatons to maintain an association between the data and the data management information when the data is involved in operations within the process, and to associate data management information with other data resulting from operations involving the data.

49. The apparatus of claim 47, wherein the tag propagation module is to examine the data management information when the data is to be involved in an operation external to the process, and to cause the operation to be allowed if it is compatible with the data management information.

50. The apparatus of claim 49, wherein the tag propagation module is to cause the operation to be blocked if the operation is not compatible with the data management information.

51. The apparatus of claim 49, wherein the tag propagation module is to perform the operation external to the process subject to including the associated data management information with an output of the operation.

52. The apparatus of claim 44, wherein the data management information identifies a set of permitted operations.

53. A method of modifying computer code of an application, the method comprising:
identifying conditional branches in machine code;
instrumenting machine code of the application to provide information regarding entry and exit points of the conditional structures; and
modifying the machine code to include instructions that, when executed, cause a computer to regulate the data according to data management information, wherein the instructions to regulate the data according to the data management information include instructions to associate first data management information with a first subset of the data and second data management information with a second subset of the data and to verify that the data management information indicates that the data is authorized to be written by an instruction to write the data before the data is written.

54. The method of claim 53, wherein the modification is carried out before load time.

55. The method of claim 53, wherein the modification is carried out at load time.

56. The method of claims 53, further comprising creating a control flow graph representation of the code and analyzing the conditional flow graph to identify conditional branches in the code.

* * * * *

UNITED STATES PATENT AND TRADEMARK OFFICE
CERTIFICATE OF CORRECTION

PATENT NO.        : 8,069,450 B2                                   Page 1 of 1
APPLICATION NO.   : 10/765827
DATED             : November 29, 2011
INVENTOR(S)       : Yolanta Beresnevichiene et al.

It is certified that error appears in the above-identified patent and that said Letters Patent is hereby corrected as shown below:

In column 16, line 20, in Claim 19, delete "file" and insert -- a file --, therefor.

In column 20, line 3, in Claim 56, delete "claims" and insert -- claim --, therefor.

Signed and Sealed this
Sixteenth Day of October, 2012

David J. Kappos
*Director of the United States Patent and Trademark Office*